April 22, 1969   T. L. LINDH ET AL   3,440,125
DEVICE FOR USE IN MACHINES FOR MANUFACTURING
PLASTIC FOIL COVERED PAPER
Filed Feb. 4, 1965
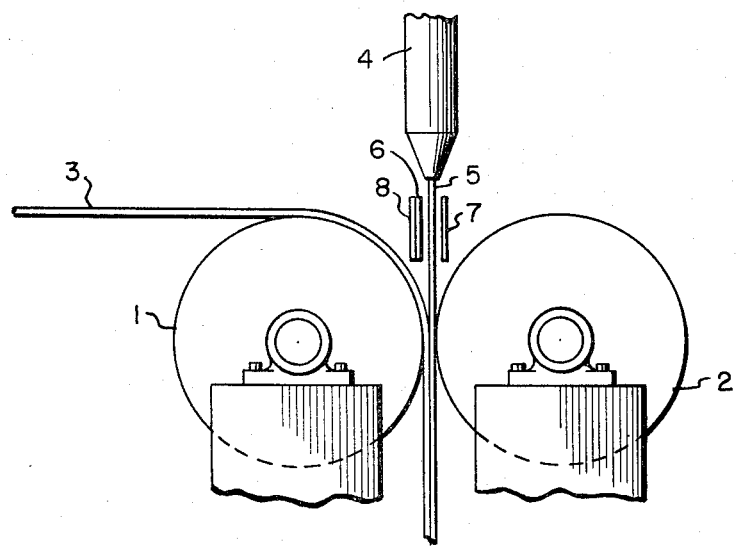
INVENTORS
TORSTEN L. LINDH
LARS O. I. LINDBLAD
BY
Earle R. Maiden
ATTORNEY

United States Patent Office 3,440,125
Patented Apr. 22, 1969

2,440,125
DEVICE FOR USE IN MACHINES FOR MANU-
FACTURING PLASTIC FOIL COVERED PAPER
Torsten Lennartson Lindh, Lund, and Lars Olof Ingemar
Lindblad, Sodra Sandby, Sweden, assignors to AB Tetra
Pak, Lund, Sweden, a Swedish company
Filed Feb. 4, 1965, Ser. No. 430,420
Claims priority, application Switzerland, Feb. 6, 1964,
1,396/64
Int. Cl. B32b 23/06, 31/20; B29f 3/00
U.S. Cl. 156—498  1 Claim

ABSTRACT OF THE DISCLOSURE

Method and apparatus to manufacture plastic covered paper in which one side of the extruded plastic is maintained at a high temperature to ensure a good bond with the paper and the other side is cooled rapidly to prevent oxidation.

---

The present invention refers to a device for use in machines for manufacturing plastic foil covered paper and has as a principal object to assist in providing an improved adhesion between the paper and the foil of plastic.

A generally practised method for covering a paper web with a foil of plastic is to advance the paper web across a rubber roll and through the nip between the latter and a cooling roll of metal, at the same time as the foil of plastic is extruded from a nozzle provided thereabove and directed downwardly, so that the foil will run down to meet the paper web at the entrance to the nip. Provided that the foil of plastic is of sufficiently high temperature when applied to the paper web during its passage between the rolls, it is bonded to the web with an ample amount of adhesion. On its way on to the paper web, however, the hot foil emerging from the nozzle is subjected to heat losses to the environment, so that the temperature of the foil may go down below that required for obtaining the desired amount of adhesion between the foil and the paper web. To avoid this drawback it has been suggested to prevent the heat losses by mounting a heat reflecting metallic screen at each side of the foil of plastic between the extruder nozzle and the rolls. These two screens both assist in keeping the temperature in the environment of the foil of plastic at a higher level and to reflect heat back to the foil. Owing to the higher temperature of the foil thus achieved, another drawback is encountered, however, which consists in the fact that the foil is subjected to oxidation.

As a result of the invention, it is achieved that the temperature of the foil of plastic can be maintained at a high level on the side to be bonded to the paper web but kept at a low level on the other side, so that the foil is not oxidized on this other side. The invention consists in a device in which on either side of the path which a foil of plastic extruded from an extruder nozzle has to follow up to the point where it encounters a paper web there are provided a bright and a blackened screen, respectively, the bright screen being on the side from which the paper web is intended to engage the foil and the blackened screen is on the opposite side.

The invention will be explained with reference to the accompanying diagrammatic drawing which in parts shows a machine for manufacturing plastic foil covered paper (paper-plastic laminate). Thus, in the drawing there are shown a rubber roll 1 and a metallic roll 2 cooperating therewith, which is adapted to allow the passage therethrough, in a manner not shown, of a cooling medium so as to act as a cooling roll. A paper web 3 can be passed across parts of the machine not shown on to the rubber roll 1 and into the nip between this roll and the cooling roll 2. Straight above the rolls there is provided a downwardly directed extruder nozzle 4 which is associated with an extrusion machine, otherwise not illustrated, for extruding a thermoplastic, such as polystyrene, in the shape of a foil 5. As it emerges from the nozzle, this foil 5 moves straight down into the nip between the rolls 1 and 2, and there meets the paper web 3. Owing to its still hot plastic condition and the pressure exerted by the rolls the foil of plastic is bonded to the paper web, so that a plastic foil covered paper is obtained. The device described in principle above is generally known and used.

In this device the length of the path from the nozzle 4 to the nip between the rolls 1 and 2 cannot always, for constructional reasons, be made so short as would be desirable to avoid excessive cooling of the foil, before it is brought together with the paper web. The bonding of the foil to the latter is under such conditions open to the risk of not being perfect. It is true that the provision of bright heat-reflecting metallic screens on either side of said length of path, according to the proposal mentioned in the introduction, efficiently neutralizes the cooling of the foil, but precisely for this reason it causes an oxidation on both sides of the foil of plastic, while the latter travels the relatively long way to the paper web.

According to the present invention, a heat-reflecting metallic screen 6, e.g. from aluminium, is provided on one side of the abovementioned path facing the side of the foil of plastic 5 which is to contact the paper web 3, while on the other side of the path there is provided a blackened metallic screen 7 which accordingly faces the free side of the foil of plastic 5 and acts as an absolutely black and, therefore, heat absorbing body. The metallic screen 6 is besides heat insulated in relation to the environment by being mounted with its back on a heat insulating plate 8 to counteract heat losses which arise by the dissipation of part of the radiation heat received by the screen. The blackened metallic screen 7, on the other hand, has to be in heat conducting relationship with the environment and should preferably be cooled for example by means of a circulating cooling medium (not shown) to increase the heat absorbing capacity of this screen.

The effect of the device according to the invention, as described above, is that the foil of plastic 5 when brought together with the paper web 3 still has a high temperature on the side which comes in contact with the paper web, so that a good bond with the latter is obtained, but on the other side cools so rapidly after emerging from the extruder nozzle 4 that the undesirable oxidation on this side is avoided.

We claim:
1. Apparatus to provide a plastic covered paper comprising: an extruder, said extruder being capable of extruding a plastic foil, means operably associated with said extruder to laminate the foil from said extruder to a web of paper, a heat reflecting screen operably associated with one side of said foil between said extruder and said lami- nating means to maintain said side of said foil at an elevated temperature and a heat absorbing screen between said extruder and said laminating means and operably associated with the other side of said foil to enhance cooling thereof to prevent oxidation.

References Cited

UNITED STATES PATENTS

| | | | |
|---|---|---|---|
| 1,830,788 | 11/1931 | Forman | 165—133 XR |
| 2,680,437 | 6/1954 | Miller | 126—270 |
| 3,023,753 | 3/1962 | Wheless | 128—372 |
| 3,038,463 | 6/1962 | Daymon | 126—270 |
| 3,077,428 | 2/1963 | Heuser et al. | 156—244 XR |
| 3,129,703 | 4/1964 | Tabor | 126—270 |

EARL M. BERGERT, *Primary Examiner.*

G. W. MOXON II, *Assistant Examiner.*

U.S. Cl. X.R.

156—499, 500